US009673620B2

(12) United States Patent
Johannsen et al.

(10) Patent No.: US 9,673,620 B2
(45) Date of Patent: Jun. 6, 2017

(54) ENERGY SUPPLY NETWORK; METHOD AND AIRCRAFT OR SPACECRAFT

(71) Applicants: Airbus Operations GmbH, Hamburg (DE); Airbus Operations S.A.S, Toulouse (FR)

(72) Inventors: Martin Johannsen, Tengstedt (DE); Torben Schroeter, Jork (DE); Lucien Prisse, Toulouse (FR); Jerome Mavier, Toulouse (FR); Martina Hinze, Beauzelle (FR)

(73) Assignee: Airbus Operations GmbH, Hamburg (DE)

( * ) Notice: Subject to any disclaimer, the term of this patent is extended or adjusted under 35 U.S.C. 154(b) by 1164 days.

(21) Appl. No.: 13/864,462

(22) Filed: Apr. 17, 2013

(65) Prior Publication Data

US 2013/0307324 A1 Nov. 21, 2013

Related U.S. Application Data

(60) Provisional application No. 61/625,140, filed on Apr. 17, 2012.

(30) Foreign Application Priority Data

Apr. 17, 2012 (EP) .................................... 12164499

(51) Int. Cl.
*H02J 1/00* (2006.01)
*H02J 4/00* (2006.01)

(52) U.S. Cl.
CPC ........ *H02J 1/00* (2013.01); *H02J 4/00* (2013.01); *H02J 2001/008* (2013.01); *Y10T 307/25* (2015.04)

(58) Field of Classification Search
CPC .......... H02J 1/00; H02J 4/00; H02J 2001/008; Y10T 307/25
See application file for complete search history.

(56) References Cited

U.S. PATENT DOCUMENTS 4,262,242 A * 4/1981 Glennon ................... H02P 9/14
307/16
5,903,066 A 5/1999 Enjeti et al.
(Continued)

FOREIGN PATENT DOCUMENTS

| EP | 1968177 | 9/2008 |
|---|---|---|
| WO | 9819385 | 5/1998 |

OTHER PUBLICATIONS

European Search Reprot, Jul. 30, 2012.
European Search Reprot, Jul. 19, 2016.

*Primary Examiner* — Zeev V Kitov
(74) *Attorney, Agent, or Firm* — Greer, Burns & Crain Ltd.

(57) ABSTRACT

An energy supply network, especially for an aircraft or spacecraft, including a first coupling device, the first coupling device being configured to couple the energy supply network to an external energy source, a first high voltage direct current, HVDC, segment, the first HVDC segment being coupled to the first coupling device and a second HVDC segment, the second HVDC segment being coupled to the first coupling device. Also provided is a corresponding method and an aircraft or spacecraft incorporating such an energy supply network.

18 Claims, 5 Drawing Sheets

(56) References Cited

U.S. PATENT DOCUMENTS

| | | | |
|---|---|---|---|
| 2004/0129835 A1* | 7/2004 | Atkey | B64D 13/06 244/118.5 |
| 2004/0202012 A1 | 10/2004 | Ferens | |
| 2008/0298103 A1* | 12/2008 | Bendre | H02M 7/487 363/89 |
| 2009/0034305 A1 | 2/2009 | Mechi | |
| 2012/0025604 A1 | 2/2012 | Baumann et al. | |

* cited by examiner

ENERGY SUPPLY NETWORK; METHOD AND AIRCRAFT OR SPACECRAFT

CROSS-REFERENCES TO RELATED APPLICATIONS

This application claims the benefit of the U.S. Provisional Application No. 61/625,140, filed on Apr. 17, 2012, and of the European patent application No. 12 164 499.1 filed on Apr. 17, 2012, the entire disclosures of which are incorporated herein by way of reference.

TECHNICAL FIELD

The invention relates to an energy supply network, especially for an aircraft or spacecraft and a corresponding method. The present invention furthermore relates to a corresponding aircraft or spacecraft.

BACKGROUND OF THE INVENTION

Although applicable to any electric system that comprises various segments with different voltages, the present invention will be described in combination with an energy supply network in an aircraft.

In modern aircraft a variety of electric components are used in different fields. Electric components are for example used in the cabin of an aircraft e.g. the infotainment of an aircraft. Electric components can also be used e.g. in the cargo bay of an aircraft. Furthermore electric components can be used in the control system of an aircraft and as actuators for mechanical components of an aircraft e.g. the flaps and rudders.

The electric systems in modern aircraft are usually powered either by a 28Volt direct current (dc) energy supply and/or by a 115Volt alternating current (ac) energy supply.

Furthermore, modern aircraft can be coupled to a so called ground power unit while parking at e.g. an airport.

A ground power unit can for example be implemented as a vehicle which is capable of supplying power to an aircraft which is parked on the ground. Ground power units may also be built into the jetway.

SUMMARY OF THE INVENTION

The present invention discloses:

An energy supply network, especially for an aircraft or spacecraft, comprising a first coupling device, the first coupling device being configured to couple the energy supply network to an external energy source, a first high voltage direct current, HVDC, segment, the first HVDC segment being coupled to the first coupling device, a second HVDC segment, the second HVDC segment being coupled to the first coupling device.

A method for supplying electric energy, especially in an aircraft or spacecraft, comprising the steps of receiving an alternating current from an external energy source, rectifying the received alternating current for a first HVDC segment, transforming the received alternating current, and rectifying the transformed alternating current for a second HVDC segment.

An aircraft or spacecraft, comprising an energy supply network according to the present invention, and one or more electric loads, the electric loads being supplied with electric energy by the energy supply network.

The present invention is based on the conclusion that introducing high voltage dc segments, HVDC segments, within an energy supply network allows reducing the sizes of the cables of the energy supply network in contrast to the cable sizes needed when using conventional AC current for supplying electric loads in an aircraft or spacecraft.

The size of the cables depends on the current that runs through said cables. Therefore, if the total amount of electric power that is delivered in a supply network is constant the higher the voltage is the lower the current is that runs through the cables, and, therefore, the required cable size decreases.

The present invention is furthermore based on the conclusion that different electric loads may have different power levels.

Therefore, the present invention uses this knowledge to provide an energy supply network with two different HVDC segments for supplying electric energy to electric loads of different power levels.

The present invention furthermore provides a first coupling device in the energy supply network, wherein the first coupling device allows coupling the energy supply network to external power supply units, e.g. ground power units at an airport.

Additionally, the present invention discloses the usage of an energy supply network according to the present invention in an aircraft to supply electric loads of the aircraft with electric energy.

Using the energy supply network according to the present invention in an aircraft allows providing different voltage levels for electric loads of different power levels in an aircraft and at the same time effectively distributing the electric energy. By providing said different voltage levels it is possible to select cables of reduced wire diameter and therefore reduce the overall weight of the energy supply network.

Further embodiments of the present invention are subject of the further subclaims and of the following description, referring to the drawings.

In a possible embodiment the first HVDC segment and/or the second HVDC segment each comprise a rectifier, wherein the rectifier in each case is coupled between the first coupling device and at least one load connection means of the respective HVDC segment, wherein the load connection means are configured to electrically couple electric loads to the respective HVDC segment. This allows a flexible configuration of the energy supply network and adapting the energy supply network to different use cases.

In a possible embodiment the energy supply network comprises an alternating current segment, the alternating current segment being coupled to the first coupling device. This allows supplying electric loads which are connected to the energy supply network directly with the alternating current received at the first coupling device without the need to transform the received electric energy.

In a possible embodiment the alternating current segment provides a voltage level between a first alternating voltage threshold value and a second alternating voltage threshold value. This allows a flexible configuration of the energy supply network and adapting the energy supply network to different use cases.

In a possible embodiment the first HVDC segment comprises a unipolar HVDC segment with a voltage level between zero and a first direct current voltage threshold value. Alternatively the first HVDC segment comprises a bipolar HVDC segment with a voltage level between a second direct current voltage threshold value and a third direct current voltage threshold value. This allows a flexible configuration of the energy supply network and adapting the energy supply network to different use cases.

In a possible embodiment the second HVDC segment comprises a bipolar HVDC segment with a voltage level between a fourth direct current voltage threshold value and a fifth direct current voltage threshold value. This allows a flexible configuration of the energy supply network and adapting the energy supply network to different use cases.

In a possible embodiment the energy supply network comprises a voltage transforming device, the voltage transforming device being coupled between the first coupling device and the second HVDC segment. This allows adapting the electric energy received at the first coupling device to any voltage level that is needed in a specific application in the second HVDC segment.

In a possible embodiment the voltage transforming device comprises a transformer, the transformer comprising a primary winding coupled to the second HVDC segment and a secondary winding coupled to the first coupling device. Using a standard transformer allows creating a very robust voltage transforming device of little complexity.

In a possible embodiment the voltage transforming device comprises a transformer, the transformer comprising a primary winding, wherein the primary winding comprises an autotransformer, the autotransformer being coupled to the first coupling device and the second HVDC segment, and the transformer comprising a secondary winding, the secondary winding being coupled to the first HVDC segment. Using an autotransformer as a primary winding to a transformer allows building a very compact energy supply network. In one embodiment the second HVDC segment is connected to the output of the autotransformer and the first coupling device is connected to the input of the autotransformer. Therefore a very simple power transformation from the external power source to the second HVDC segment is possible. In one embodiment the first HVDC segment is connected to the secondary winding of the transformer. This arrangement provides galvanic isolation of the external power source from the first HVDC segment and allows using a unipolar first HVDC segment with reference to ground. Without the galvanic isolation using a unipolar first HVDC segment would cause a short circuit between the ground potential of the first HVDC segment and the external power source.

In a possible embodiment the voltage transforming device is configured to output a voltage with a voltage level between a third alternating voltage threshold value and a fourth alternating voltage threshold value. This allows a flexible configuration of the energy supply network and adapting the energy supply network to different use cases.

In a possible embodiment the energy supply network comprises an electric generator, and a second coupling device, the second coupling device being coupled between the voltage transforming device and the second HVDC segment and being coupled to the electric generator. This allows providing an energy supply network which can be supplied with electric energy from an external energy source as well as from the internal generator. This allows autonomous operation of the energy supply network when there is no external energy source present.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

DETAILED DESCRIPTION OF THE PREFERRED EMBODIMENTS

Figure 1:
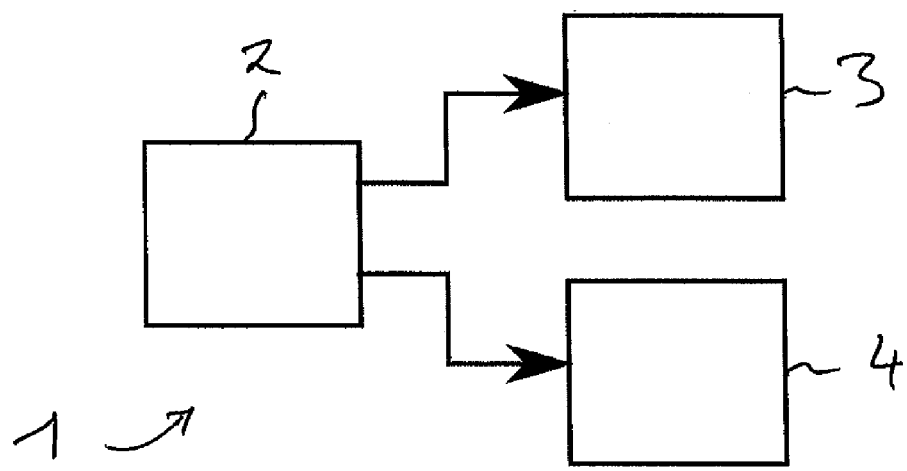
FIG. 1 shows a block diagram of a possible embodiment of an energy supply network according to the present invention.

FIG. 1 shows a block diagram of a possible embodiment of an energy supply network 1 according to the present invention.

The energy supply network 1 in FIG. 1 comprises a first coupling device 2, the first coupling device 2 being coupled to a first high voltage direct current, HVDC, segment 3 and a second HVDC segment 4.

The first coupling device 2 is configured to couple the energy supply network 1 to an external power source. In one embodiment the first coupling device 2 is configured to couple the energy supply network 1 to a ground power unit (GPU) used in airports to supply electric energy to aircraft. In this embodiment the first coupling device 2 is configured to receive a 115Volt alternating current, ac, electric energy with a frequency of 400 Hz. In one embodiment the first coupling device 2 is configured to receive a single phase ac voltage. In another embodiment the first coupling device 2 is configured to receive a multi-phase ac voltage, especially a three-phase ac voltage.

In other embodiments the first coupling device 2 is configured to receive electric energy at other voltage levels or with other frequencies.

According to the invention the first HVDC segment 3 is configured to provide electric energy to loads with a voltage level between zero volts and a first direct current, dc, voltage threshold value, or between a second dc voltage threshold value and a third dc voltage threshold value with reference to ground.

Furthermore, the second HVDC segment 4 is configured to provide electric energy to loads with a voltage level between a fourth dc voltage threshold value and a fifth dc voltage threshold value.

Table 1 shows exemplary voltage ranges and an exemplary voltage value for the first to fifth dc voltage threshold values, respectively.

TABLE 1

(possible voltage ranges for dc threshold values in Volt)

|  | Voltage range A | Voltage range B | Voltage |
|---|---|---|---|
| first threshold value | +100–+500 | +200–+350 | +270 |
| second threshold value | +50–+300 | +100–+200 | +135 |
| third threshold value | −50–−300 | −100–−200 | −135 |
| fourth threshold value | +100–+500 | +200–+350 | +270 |
| fifth threshold value | −100–−500 | −200–−350 | −270 |

If the first HVDC segment 3 is configured as a unipolar HVDC segment 3 the voltage level of first HVDC segment 3 with reference to ground can be selected according to the voltage ranges A (+100V-+500V), B (+200V-+350V) or according to the specified voltage (+270V) which are listed in table 1 for the first dc threshold value. If the first HVDC segment 3 is configured as a bipolar HVDC segment 3 the voltage level of a positive terminal of the first HVDC segment 3 can be selected according to the voltage ranges A (+50V-+300V), B (+100V-+200V) or according to the specified voltage (+135V) which are listed in table 1 for the second dc threshold value. The voltage level of a negative terminal of the first HVDC segment 3 can be selected according to the voltage ranges A (−50V-−300V), B (−100V-−200V) or according to the specified voltage (−135V) which are listed in table 1 for the third dc threshold value. The voltage levels for the second HVDC segment 3 can be selected according to the voltage values listed in table 1 for the fourth dc threshold value and the fifth dc threshold value. Any combination of the values listed in Table 1 is possible for the respective threshold values. Other values are also possible for the threshold values depending on the application the energy supply network according to the present invention is employed in.

Figure 2:
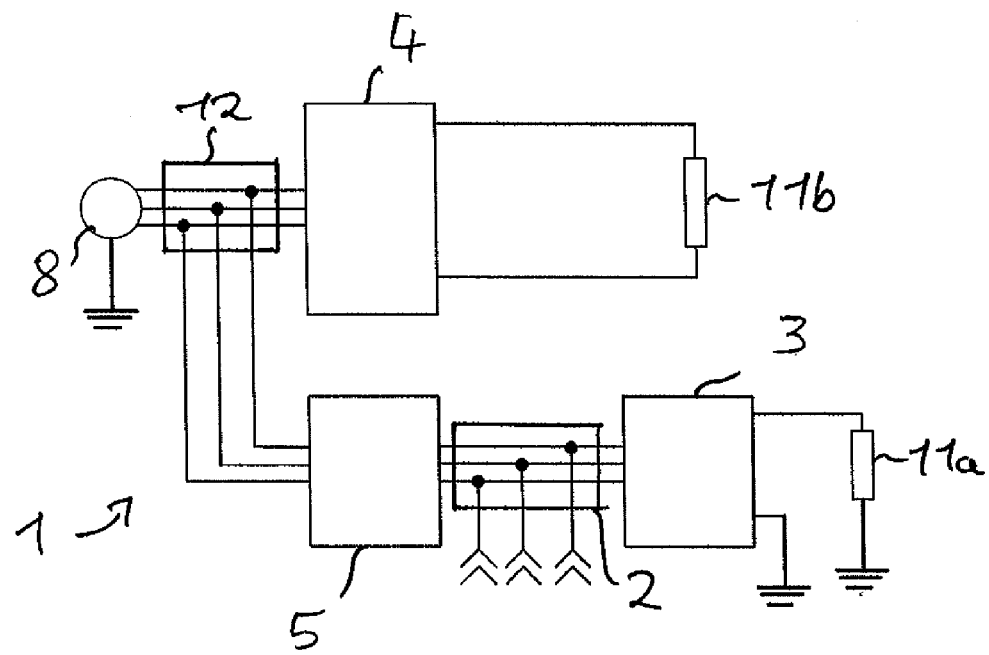
FIG. 2 shows a block diagram of another possible embodiment of an energy supply network according to the present invention.

FIG. 2 shows a block diagram of another possible embodiment of an energy supply network according to the present invention.

The energy supply network 1 in FIG. 2 differs from the energy supply network 1 in FIG. 1 in that the energy supply network 1 comprises a voltage transforming device 5 that is connected between the first coupling device 2 and a second coupling device 12, the second coupling device 12 being coupled to an electric generator 8 and the second HVDC segment 4. Furthermore, in FIG. 2 electric loads 11a are coupled to the first HVDC segment 3 and electric loads 11b are coupled to the second HVDC segment 4.

The first HVDC segment 3 in FIG. 2 is a unipolar HVDC segment 3, where the loads 11a are supplied only with a positive voltage to ground. Consequently, the load 11a coupled to the first HVDC segment 3 is coupled to the first HVDC segment 3 with only one electric connection. A second electric connection connects the load 11a to ground. The first HVDC segment 3 is also connected to ground.

The second HVDC segment in FIG. 2 is a bipolar HVDC segment 4, where the loads 11b are supplied with a positive voltage and a negative voltage with reference to ground. Consequently, the load 11b coupled to the second HVDC segment 4 is coupled to the second HVDC segment 4 via two electric connections, one electric connection for the positive voltage and one electric connection for the negative voltage.

Figure 3:
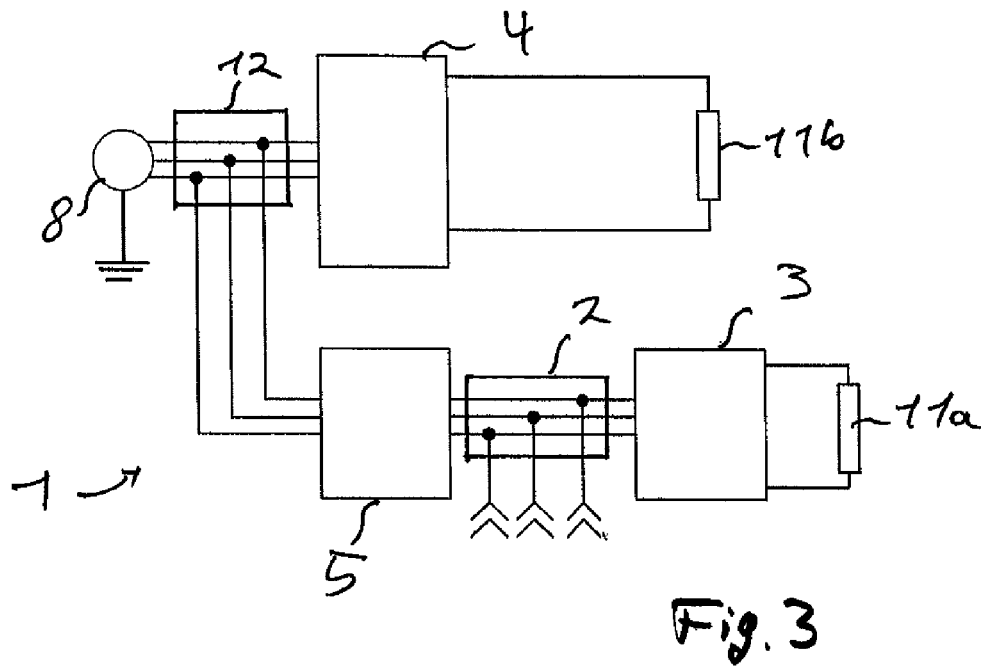
FIG. 3 shows a block diagram of another possible embodiment of an energy supply network according to the present invention.

FIG. 3 shows a block diagram of another possible embodiment of an energy supply network 1 according to the present invention.

The energy supply network 1 in FIG. 3 differs from the energy supply network 1 in FIG. 2 in that the first HVDC segment 3 is configured as a bipolar HVDC segment 3.

Consequently, the load 11a that is connected to the first HVDC segment 3 is connected to the first HVDC segment 3 via a positive electric connection and a negative electric connection.

Figure 4:
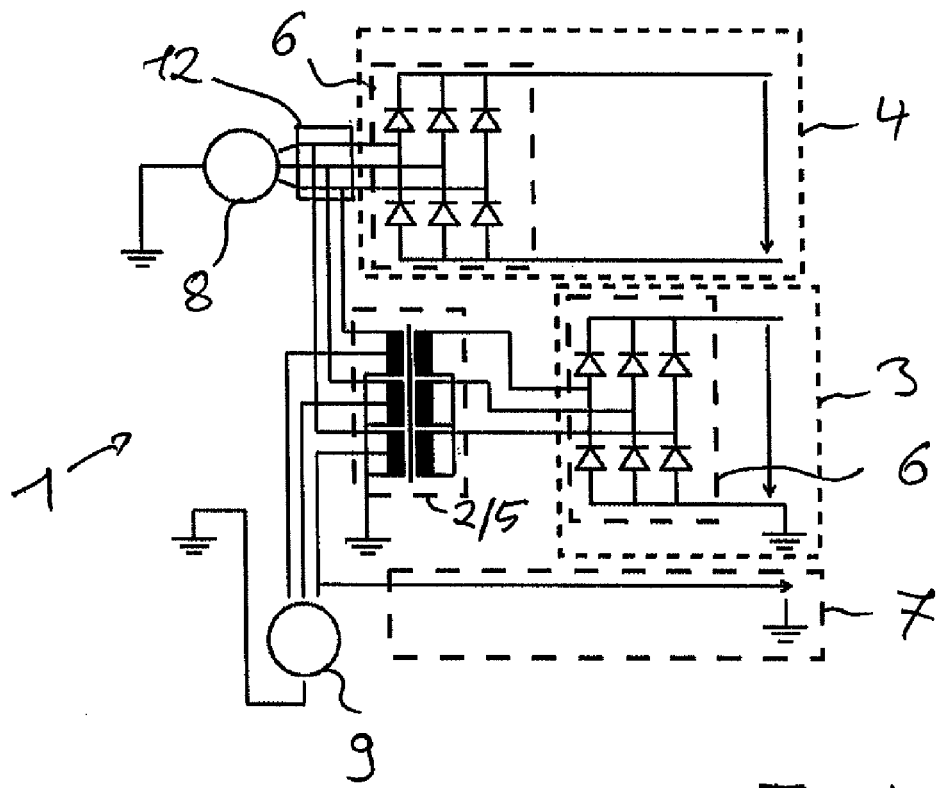
FIG. 4 shows a block diagram of another possible embodiment of an energy supply network according to the present invention.

FIG. 4 shows a block diagram of another possible embodiment of an energy supply network 1 according to the present invention.

In FIG. 4 the energy supply network 1 is a three phase energy supply network 1 with three different segments 3, 4 and 7.

The first HVDC segment 3 is a unipolar HVDC segment 3 providing a positive voltage with ground reference. The first HVDC segment 3 comprises a rectifier 6a which is configured to provide a single dc voltage from the three phases of the energy supply network 1.

The second HVDC segment 4 is a bipolar HVDC segment 4 providing a positive voltage and a negative voltage with reference to ground. The second HVDC segment 4 also comprises a rectifier 6b which is configured to provide the two voltages, the positive voltage and the negative voltage, from the three phases of the energy supply network 1.

The third segment 7 is an AC segment 7, which is directly connected to the external power source to power electric ac loads. Conventional aircraft comprise an AC segment and the electric loads in a conventional aircraft are ac loads. Therefore, providing an AC segment 7 in the energy supply network allows supplying electric power to conventional electric loads, e.g. in an aircraft.

In the energy supply network 1 in FIG. 4 the voltage transforming device 5 is provided as a three phase transformer 5 with a primary winding which is coupled to the second HVDC segment 4 via a second coupling device 12, and a secondary winding which is coupled to the first HVDC segment 3. The transformer 5 comprises three phases, one for every phase of the energy supply network 1.

Figure 7:
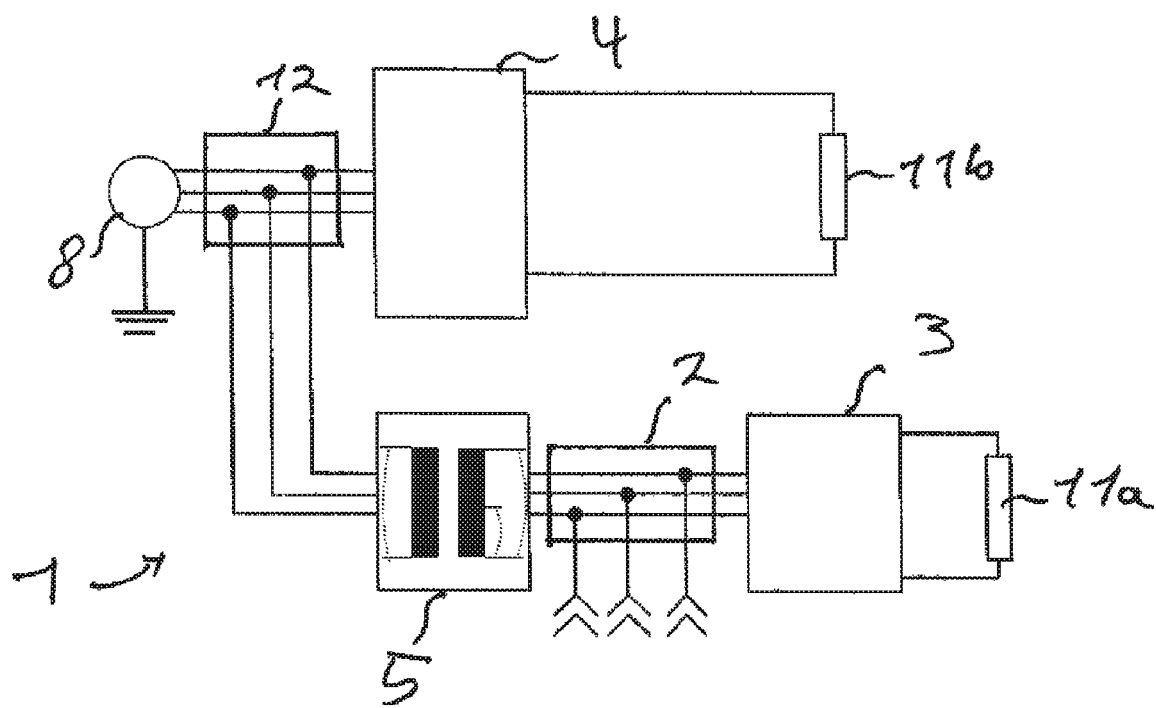
FIG. 7 shows a block diagram of another possible embodiment of an energy supply network according to the present invention.

The transformer 5 in FIG. 4 also comprises the first coupling device 2 which couples the energy supply network 1 with an external power source 9. In this exemplary embodiment the first coupling device 2 is integrated in the primary winding of the transformer 5. This is done by providing the primary winding of the transformer 5 as an autotransformer, as shown in FIG. 7. Accordingly, the second HVDC segment 4 is connected to the output of the autotransformer and the first coupling device 2 is connected to the input of the autotransformer. In addition, the first HVDC segment 3 is connected to the secondary winding of the transformer 5. This arrangement provides galvanic isolation of the external power source from the first HVDC segment 3 and allows using a unipolar first HVDC segment 3 with reference to ground. Without the galvanic isolation using a unipolar first HVDC segment 3 would cause a short circuit between ground potential of the first HVDC segment 3 and the external power source 9. A galvanic isolation between the external power source 9 and the second HVDC segment 4 is not necessary because the second HVDC segment 4 is a bipolar HVDC segment 4.

An autotransformer is an electric transformer that transforms an ac voltage from one voltage level to another voltage level. The autotransformer uses only one winding wherein portions of the one winding act as primary and secondary winding. This single winding has at least three electric taps; e.g. one common ground tap, one primary tap and one secondary tap. Due to the only one winding the autotransformer—in contrast to standard transformers—cannot provide galvanic isolation.

Finally, the energy supply network 1 in FIG. 4 comprises a three phase generator 8 which is coupled to the energy supply network 1 via the second coupling device 12, which is coupled between the transformer 5 and the second HVDC segment 4.

In one embodiment the generator voltage of the generator 8 is a 230Volts ac voltage with a variable frequency of 100 Hz-1000 Hz, especially 250 Hz-900 Hz, especially 360 Hz-800 Hz. This allows reducing the dimensions of the electric wires and, thus, reducing the weight of the energy supply network 1.

In other embodiments the voltage of the generator 8 is a 50Volts-250Volt, especially 115Volts ac voltage. This allows using standard components already tested and qualified in the field of e.g. avionics.

The embodiment shown in FIG. 4 allows supplying three different voltages for the three different segments 3, 4, 7 of the energy supply network 1 and at the same time provides galvanic isolation between the external power supply 9 or the generator 8 and the loads which can be connected to the first HVDC segments 3.

Figure 5:
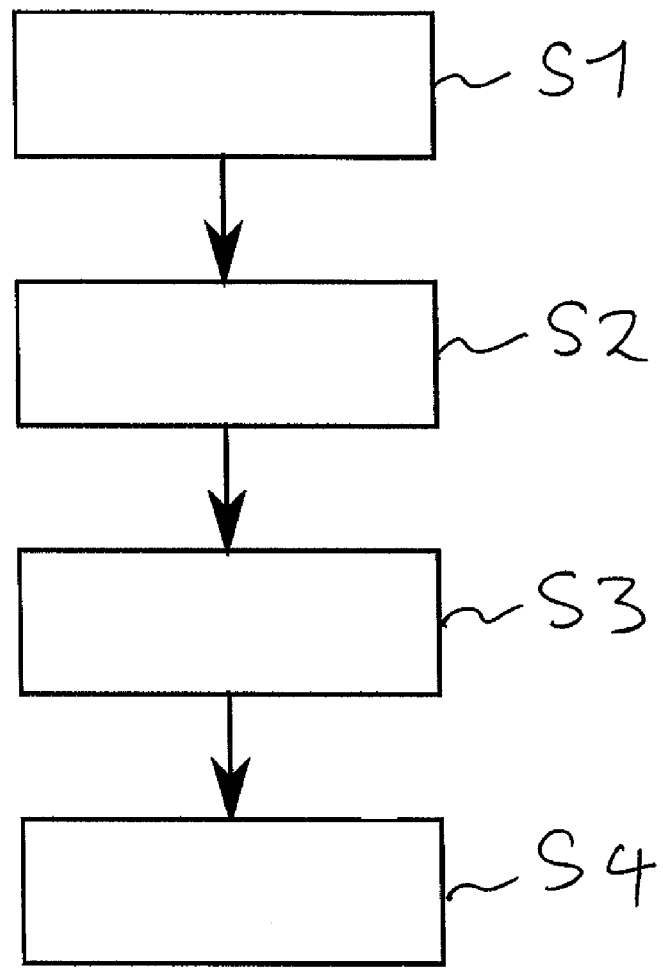
FIG. 5 shows a diagram of a possible embodiment of a method according to the present invention.

FIG. 5 shows a diagram of a possible embodiment of a method according to the present invention.

According to the present invention in a first step S1 an alternating current is received from an external energy source 9. In a second step S2 the received alternating current is rectified for a first HVDC segment 3. Furthermore, in a third step S3 the received alternating current is transformed. Finally, in a fourth step S4 the transformed alternating current is rectified for a second HVDC segment 4.

Figure 6:
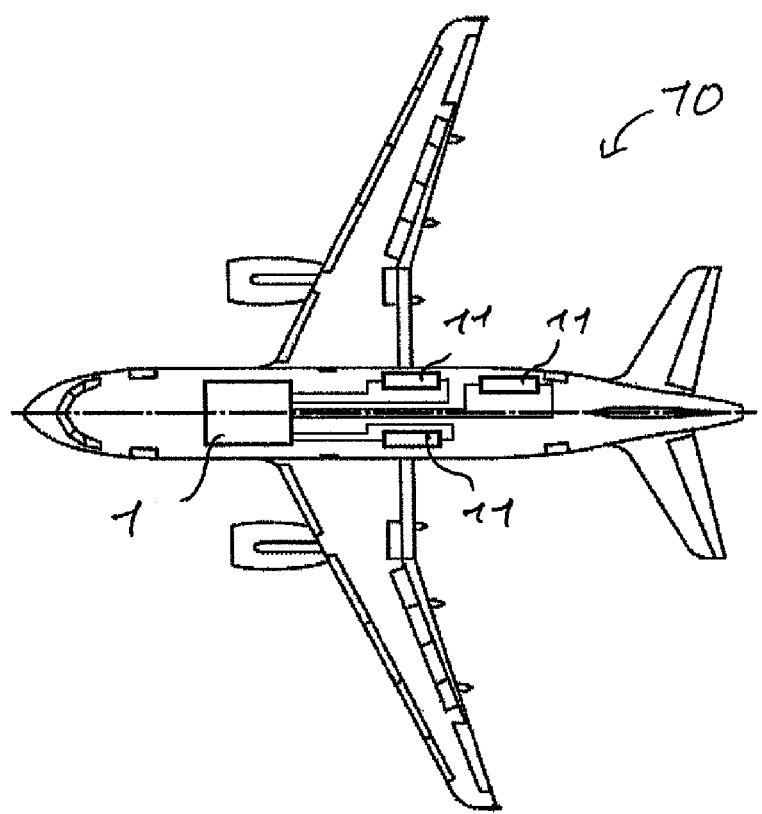
FIG. 6 shows a block diagram of a possible embodiment of an aircraft according to the present invention.

FIG. 6 shows a block diagram of a possible embodiment of an aircraft or spacecraft 10 according to the present invention.

The aircraft 10 comprises an energy supply network 1 according the present invention. Furthermore the aircraft 10 comprises three electric loads 11 being supplied with electric energy by the energy supply network 1.

The loads in the aircraft can comprise a variety of different loads 11. For example the loads can comprise low power loads, like e.g. cabin lights, high power loads, like e.g. flaps actuators, or cargo and cabin loads.

Each of the loads 11 is connected to one of the HVDC segments 3, 4 or the alternating current segment depending on the requirements of the respective load's 11.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily drawn to scale relative to each other. Like reference numerals designate corresponding similar parts.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An energy supply network comprising:
   a first coupling device, the first coupling device being configured to electrically couple the energy supply network to an external energy source;
   a first high voltage direct current, HVDC, segment, the first HVDC segment being coupled to the first coupling device;
   a second HVDC segment, the second HVDC segment being coupled to the first coupling device,
   wherein the first HVDC segment and the second HVDC segment are configured to supply electric energy to electric loads of different power levels,
   a voltage transforming device, the voltage transforming device being coupled between the first coupling device and the second HVDC segment,
   wherein the voltage transforming device comprises a transformer, the transformer comprising a primary winding coupled to the second HVDC segment and a secondary winding coupled to the first coupling device.

2. The energy supply network according to claim 1, wherein at least one of the first HVDC segment and the second HVDC segment comprise a rectifier, wherein the rectifier is coupled between the first coupling device and at least one load connection arrangement of the respective HVDC segment, wherein the load connection arrangement is configured to electrically couple electric loads to the respective HVDC segment.

3. The energy supply network according to claim 1, further comprising an alternating current segment, the alternating current segment being coupled to the first coupling device.

4. The energy supply network according to claim 3, wherein the alternating current segment provides a voltage level between a first alternating voltage threshold value and a second alternating voltage threshold value.

5. The energy supply network according to claim 1, wherein the first HVDC segment comprises a unipolar HVDC segment with a voltage level between zero and a first direct current voltage threshold value.

6. The energy supply network according to claim 1, wherein the first HVDC segment comprises a bipolar HVDC segment with a voltage level between a second direct current voltage threshold value and a third direct current voltage threshold value.

7. The energy supply network according to claim 1, wherein the second HVDC segment comprises a bipolar HVDC segment with a voltage level between a fourth direct current voltage threshold value and a fifth direct current voltage threshold value.

8. An energy supply network comprising:
a first coupling device, the first coupling device being configured to electrically couple the energy supply network to an external energy source;
a first high voltage direct current, HVDC, segment, the first HVDC segment being coupled to the first coupling device;
a second HVDC segment, the second HVDC segment being coupled to the first coupling device,
wherein the first HVDC segment and the second HVDC segment are configured to supply electric energy to electric loads of different power levels,
a voltage transforming device, the voltage transforming device being coupled between the first coupling device and the second HVDC segment,
wherein the voltage transforming device comprises a transformer, the transformer comprising a primary winding, wherein the primary winding comprises an autotransformer, the autotransformer being coupled to the first coupling device and the second HVDC segment, and the transformer comprising a secondary winding, the secondary winding being coupled to the first HVDC segment.

9. The energy supply network according to claim 1, wherein the voltage transforming device is configured to output a voltage with a voltage level between a third alternating voltage threshold value and a fourth alternating voltage threshold value.

10. The energy supply network according to claim 1, further comprising an electric generator; and a second coupling device, the second coupling device being coupled between the voltage transforming device and the second HVDC segment and being coupled to the electric generator.

11. A method for supplying electric energy with an energy supply network, comprising:
receiving an alternating current at a first coupling device, from an external energy source, the first coupling device being configured to electrically couple the energy supply network to the external energy source;
rectifying the received alternating current for a first HVDC segment, the first HVDC segment being coupled to the first coupling device;
transforming the received alternating current;
rectifying the transformed alternating current for a second HVDC segment, the second HVDC segment being coupled to the first coupling device,
wherein the first HVDC segment and the second HVDC segment supply electric energy to electric loads of different power levels
coupling a voltage transforming device between the first coupling device and the second HVDC segment,
wherein the voltage transforming device comprises a transformer, the transformer comprising a primary winding coupled to the second HVDC segment and a secondary winding coupled to the first coupling device.

12. The method according to claim 11, wherein receiving an alternating current comprises receiving an alternating current of a voltage level between a first alternating voltage threshold value and a second alternating voltage threshold value.

13. The method according to claim 11, wherein rectifying the received alternating current comprises rectifying the alternating current to a unipolar current with a voltage level between zero and a first direct current voltage threshold value.

14. The method according to claim 11, wherein rectifying the received alternating current comprises rectifying the alternating current to a bipolar current with a voltage level between a second direct current voltage threshold value and a third direct current voltage threshold value.

15. The method according to claim 11, wherein transforming the received alternating current comprises transforming the received alternating current to a current with a voltage level between a third alternating voltage threshold value and a fourth alternating voltage threshold value.

16. The method according to claim 11, wherein rectifying the transformed alternating current comprises rectifying the transformed alternating current to a direct current with a voltage level between a fourth direct current voltage threshold value and a fifth direct current voltage threshold value.

17. An aircraft or spacecraft, comprising an energy supply network according to claim 1, and one or more electric loads, the electric loads being supplied with electric energy by the energy supply network.

18. The energy supply network according to claim 1, wherein the energy supply network is located in an aircraft or spacecraft.

* * * * *